ANALOGUE-TO-DIGITAL CONVERTERS

Original Filed Nov. 20, 1956 4 Sheets-Sheet 1

INVENTOR.
ROBERT N. STRAEHL

BY T. L. Styner
ATTORNEY

Dec. 1, 1964 R. N. STRAEHL 3,159,829

ANALOGUE-TO-DIGITAL CONVERTERS

Original Filed Nov. 20, 1956 4 Sheets-Sheet 2

United States Patent Office 3,159,829
Patented Dec. 1, 1964

3,159,829

ANALOGUE-TO-DIGITAL CONVERTERS

Robert N. Strachl, Pittsford, N.Y., assignor to General Dynamics Corporation, Rochester, N.Y., a corporation of Delaware Continuation of application Ser. No. 623,359, Nov. 20, 1956. This application Apr. 14, 1961, Ser. No. 103,693
5 Claims. (Cl. 340—347)

This invention relates to analogue-to-digital converters, and is particularly directed to a method and apparatus for sampling a voltage of known or unknown value and generating from the sample digital signals which are accurately representative of the voltage. This application is a continuation of copending application Serial No. 623,3359, filed by applicant on November 20, 1956, now abandoned.

In so-called digital voltmeters, for example, it has been proposed to compare the unknown voltage with a known voltage which is increased in value in small equal steps throughout the range of voltages under test until the values of the unknown and stepping voltages are equal or balanced, whereupon the stepping operation is interrupted. A count of the steps then yields the unknown voltage value. Where the value of the steps are small, for the purpose of obtaining reasonable resolving power and accuracy, and where the counting speed is limited, the time required for making a measurement is often undesirably long. In high speed computer systems and the like, analogue-to-digital conversion must be made at high speeds without sacrificing resolving power or accuracy.

The object of this invention is to provide an improved analogue-to-digital converter for voltages, with particular attention to increased speeds and improved accuracy.

A further object of this invention is to provide an improved method of converting analogue voltages to digital signals, which method substitutes a high speed binary counting technique for the slower bit-by-bit counting method.

The objects of this invention are attained by symmetrically arranging a plurality of voltage sources, the voltage of each source being an integral multiple (such as 2) of the next adjacent source. These voltage sources are selectively and successively applied to a common lead or bus so that the voltages numerically add on the lead. A voltage comparator is coupled between said lead and the source of the analogue voltage to be converted, and means responsive to said comparator is provided for inserting or removing those of said symmetrically arranged sources from said lead which add up to the analogue voltage.

Other objects and features of this invention will become apparent to those skilled in the art by referring to one specific embodiment described in the following specification and shown in the accompanying drawings, in which.

In an 8-digit binary system, which will be treated here, a number as high as $2^n=2^8$ or 256, can be handled in incremental steps of 1. The resolution of such a system is 1/256. The value of the highest order digit in such a system is 1/2 the full scale capacity, or $2^{n-1}$, or 128.

Likewise, the lowest order digit in such a binary system is $2^{n-n}$, or 1. Of course, $n$ can be of any value.

In the simplest approach to analogue-to-digital conversion, heretofore, the reference voltage to which the unknown is compared is varied by causing the reference voltage to increase from zero by uniform steps or increments in voltage until a balanced condition of the two is arrived at. If then a count is made of the number of said uniform steps required to just exceed the unknown voltage, the required digital representation of the unknown is achieved. For a system capable of accuracy of, say, 1 part in 256, as many as 255 counts or operations could be required to convert a voltage to digital form.

This invention obviates in a novel manner the wasteful use of time required by such a counting system. According to this invention, a voltage corresponding to the highest order digit is "turned on" and compared with the analogue voltage to be converted. The value of this highest order digit voltage is 1/2 the full scale capacity of the instrument of FIG. 1. If it is found that this 1/2 scale value exceeds the unknown voltage, the 1/2 scale voltage is turned off and the next lower valued digit is "tried." In the binary numbering system employed here, this second digit has a value of 1/4 the full scale capacity of the system. If, now, this 1/4 scale value voltage is less than the unknown voltage, it is left turned on, and is added to all lower order digit voltages the sum of which does not exceed the unknown voltage. That is, after completion of the scanning operation, the binary number represented by the sum of all digits left "on" is the value of the unknown voltage to the nearest or lowest valued digit which in this example is 1 part in 256 of the full scale value. Since only one pulse is required per digit, an 8-digit number can be completely scanned and evaluated within only 8 pulse intervals, as contrasted with the conventional counting method where 255 were required.

Figure 1:
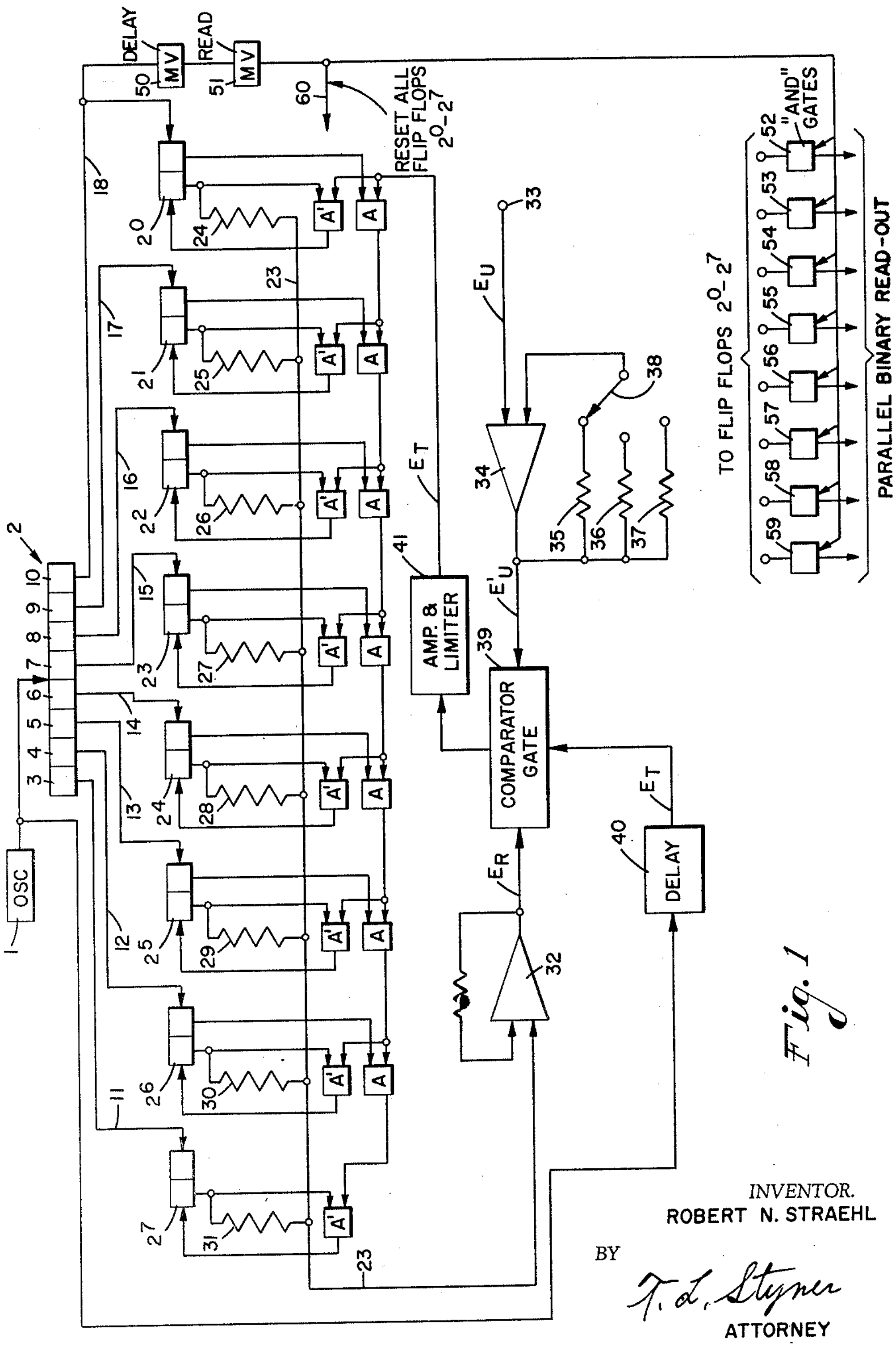
FIG. 1 is a block diagram of the circuits of said one embodiment.

Referring to FIG. 1, the oscillator 1 generates clock pulses at a rate compatible with the bandwidth limitations of the direct current amplifiers in the system. The wave of the oscillator is clipped, amplified, and otherwise shaped to produce a fairly rectangular pulse. For convenience of reference, an oscillator or clock pulse frequency of 1000 pulses per second is mentioned.

These 1000 cycle pulses are applied to the commutator 2, having 8 segments, 3 to 10 inclusive. The commutator is of the "ring-counter" type comprising, say, a series of "Eckles-Jordan" devices so coupled that any one device will turn on the next adjacent device in the ring following each pulse from oscillator 1, or other devices capable of performing this function such as multi-position glow discharge tubes or magnetron beam switching tubes. Only one device of the ring, or one output lead of the commutating device is energized at any instant of time. As input pulses are applied to the device, the distinguishing potential of the device moves successively from one lead to the next adjacent lead, and so on.

Each of the commutator leads 11 to 18 is coupled to a bistable device or flip-flop. By "flip-flop" is meant any electrical device having two stable electrical states with on input lead, or two input leads connected directly together, to turn the device "on" and another input lead to turn the device "off," and two output leads. The well-known Eckles-Jordan flip-flop has been found to be effective in the system of this invention, although bistable devices using electromechanical, transistor, or saturable reactor elements could be used. The particular characteristic desired of the flip-flop in the system here disclosed comprises two output leads from the flip-flop, one of which is at a high or distinct voltage with respect to the other. In FIG. 1, the flip-flop will be said to be "off"

when the right-hand lead is "high" and the left-hand lead is "low." The flip-flop will be said to be "on" when these two output potentials are reversed.

Figure 2:
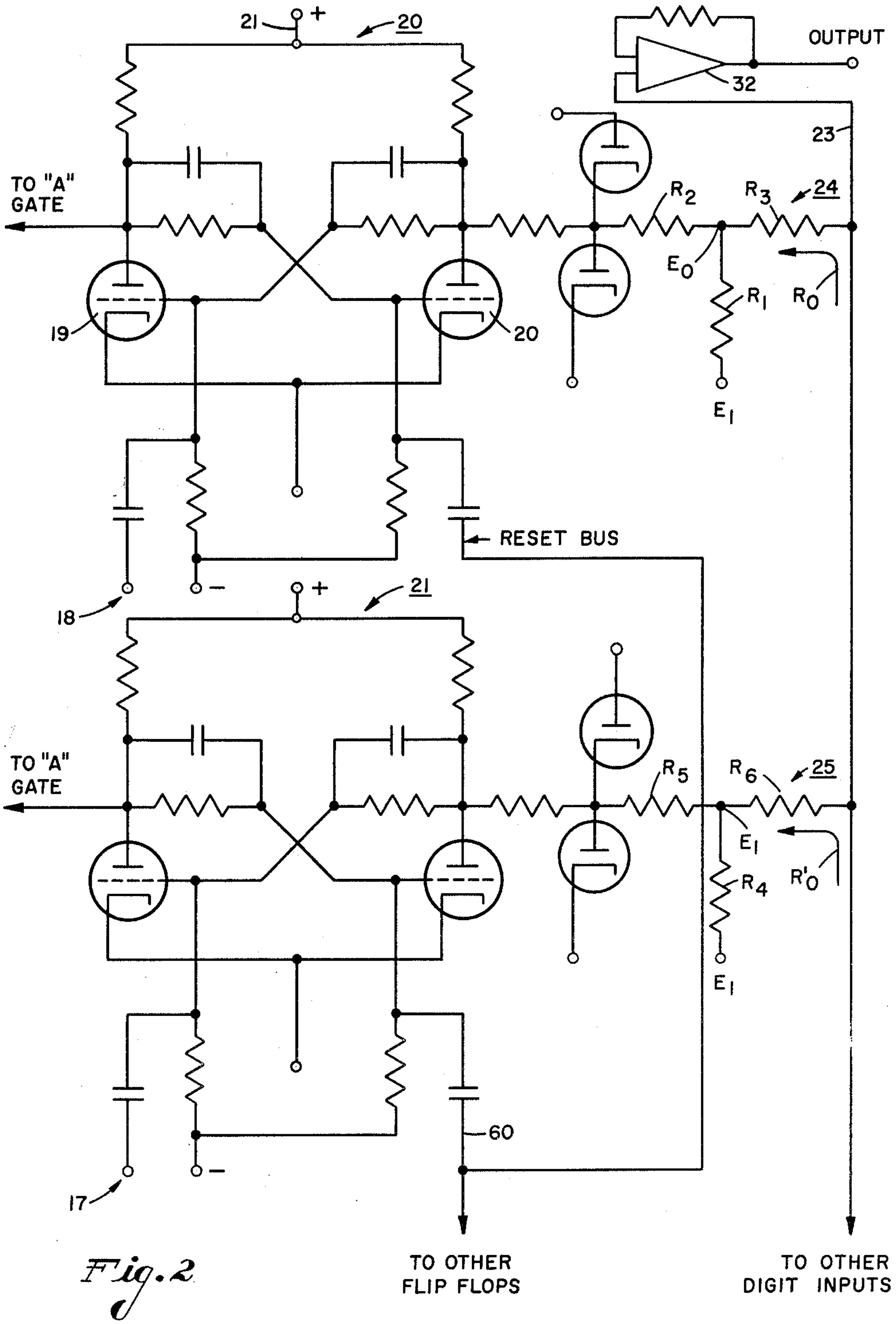
FIG. 2 is a circuit diagram of two flip-flops and their connected load circuits.

One type of flip-flop which has been found to meet the above-mentioned requirements is shown in FIG. 2, where two triodes, 19 and 20, are connected through separate load resistors to a common anode supply 21, and the cathodes are paralleled. The anode of each triode is coupled to the grid of the opposite triode. One triode is held strongly conductive, while the other is blocked.

Returning to FIG. 1, 8 flip-flops are shown, and are labeled, respectively, $2^0$, $2^1$, $2^2$, $2^3$, $2^4$, $2^5$, $2^6$, and $2^7$. Such designations are helpful in that they suggest the significance of the digit the flip-flops represent. One output lead of each flip-flop is connected through a digit-voltage source to a common bus 23. The digit-voltage sources are identified generally by 24 to 31, inclusive, in FIG. 1, although these sources are shown in detail in FIG. 2. The voltage applied to the common bus by each voltage source 24–31 is an integral multiple of the voltage source associated with the next adjacent flip-flop in the symmetrical arrangement. If the voltage applied to the common bus by flip-flop $2^0$ was 1 volt, for example, the voltage applied to the common bus by flip-flop $2^1$ would be 2 volts, and the voltage applied by $2^2$ would be 4 volts, et cetera. The voltage applied by the flip-flop $2^7$, then, would be 128 volts. Each digit-voltage is applied to the common bus only when the associated flip-flop is "on," or when the left-hand lead is "high," as will appear hereinafter, in connection with FIG. 2.

The digit voltages are added in the feedback amplifier 32. The amplifier 32 is of the well-known type in which output direct current signals are fed back to the input circuit out of phase, so that the input of the amplifier is effectively held at ground or zero potential while the output voltage is proportional to the sum of the inputs. Such a feedback "summing" amplifier is described in detail in "Electronic Analogue Computers" by Korn and Korn, McGraw-Hill 1952, pages 11 et sequel. Accordingly, the output voltage $E_R$ is proportional to the sum of the voltages contributed by sources 24–31.

The voltage to be converted to digital information is introduced at terminal 33, FIG. 1, and is applied to the resistive feedback D.C. amplifier 34. Several feedback resistors 35, 36, and 37 may be selectively connected in circuit by switch 38 to change the scale of the unknown voltage $E_U$ before its application to the comparator 39. The scales enable the system of FIG. 1 to utilize the entire range and capabilities of the voltage measuring circuits, and to thus benefit from optimum resolution. The scales may, for example, be .1, 1., and 10.

The comparator 39 functions also as a gate to pass pulses received from oscillator 1 through delay circuit 40 and to pass the pulses on to the amplifier and limiter 41. The comparator-gate 39, which will be described in detail hereinafter in connection with FIG. 3, passes the delayed pulses from 40 to 41, only while the sum voltage $E_R$ exceeds the unknown voltage (properly scaled) $E_U{}^1$.

The pulse at the output of the delay circuit 40 is delayed in time by a small fraction of the basic interpulse spacing.

The output of the amplifier limiter 41 is simultaneously applied to the two "and" gates A and A′ associated with the flip-flop of the least significant digit. The pulse thus applied to the "and" gates passes through the gates only when a high voltage is also applied from the corresponding flip-flop. Thus, "and' gate A of flip-flop $2^0$ will pass the pulse on to the "and" gates of more significant digit circuits when flip-flop $2^0$ is "off." If $2^0$ is "on," "and" gate A′ is closed, and will pass pulses, while "and" gate A is open and the delayed pulse from 40, 39, 41, passes A′ to the input of the flip-flop to reset it to "off'" condition. That is, the gate marked A will be receptive of the $E_T$ pulses if its flip-flop is in the 0 or "off" state, whereas gate A′ will be receptive if the flip-flop is "on," and the A′ gate outputs are connected back to the associated flip-flops in such a manner as to cause resetting to 0 to occur. The A gate output is connected to the inputs of both the A and the A′ gates of the next higher order stage so that the first $E_T$ pulse to occur at the comparator output will always seek out and reset the lowest order digit which is "on." The number and time of occurrence of comparator output pulses during any one complete measuring cycle will depend entirely on the specific value of the unknown voltage, but in no case can it exceed the number of digits in the system, 8 in this case. The time required to scan the entire range of values, however, is fixed and in no way related to how many "back steps" are required in arriving at a solution.

The completion of a scanning cycle occurs just after the $2^0$ flip-flop is turned "on" by the counter-commutator 2. If this lowest order digit contributes an excess to the comparator reference input, it will be reset to 0 in the same manner the 7 higher order digits are treated. If the device into which the contents of the flip-flops is to be read is capable of high speed operation, readout can be obtained without interrupting the uniform operating speed of the internal switching circuitry, and a second searching, scanning, or measuring cycle can be started without delay.

*Digit Voltage Sources*

Digit voltage sources 24 to 31 could theoretically comprise resistors as shown, the value of each resistor being twice the next adjacent resistor, in which case resistor 24 would be 256 times the resistance of resistor 31. Although this arrangement would give high resolution, and is theoretically sound, manufacture of resistors with such wide ranges of values and necessary narrow tolerances is impractical. According to this invention, the linear addition of voltages does not require a large range of resistance values to properly sum the digit-voltage values of the several significant stages. In FIG. 2, for example, the common bus 23 is connected at one output of the flip-flop $2^0$ through series resistors $R_3$ and $R_2$ and shunt resistor $R_1$. One output of flip-flop $2^1$ is connected to series resistors $R_5$ and $R_6$ and shunt resistance $R_4$. A common voltage $E_1$ is applied to the end of $R_1$, $R_4$ et cetera. The total source of resistance of each input such as $R_0$ is equal to that of all other inputs, such as $R_0{}^1$. That is, $R_3$ plus the parallel combination of $R_1$ and $R_2$ is equal to $R_6$ plus $R_4$ in parallel with $R_5$. However, the voltage divider ratio, such as $R_1/R_1+R_2$, is chosen such that the voltage at the junction ($E_0$, $E_1$, etc.) of the three resistors is proportional to the significance of that stage. Hence, $E_0=E_{1/2}$. The E voltages are the open circuit voltages at the junctions.

Figure 4:
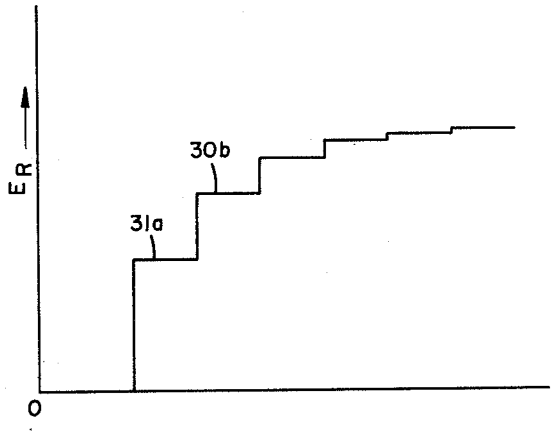
FIG. 4 is a voltage diagram of an important lead of FIG. 1.

FIG. 4 shows the manner in which the voltage on the common bus 23 increases in steps as the voltages of 24–31 are added. The first voltage step 31*a* results when flip-flop $2^7$ alone is "on." If the voltage added to the common bus by flip-flop $2^6$ is added when $2^7$ is "on," the resultant voltage 30*b* appears on the bus. As explained, the voltage of one step is twice the amplitude of the voltage of the next step. If voltages of the several stages, from the most significant to the least significant, are added to the bus, the bus voltage continues to rise as shown in FIG. 4.

*Comparator Gate*

Figure 3:
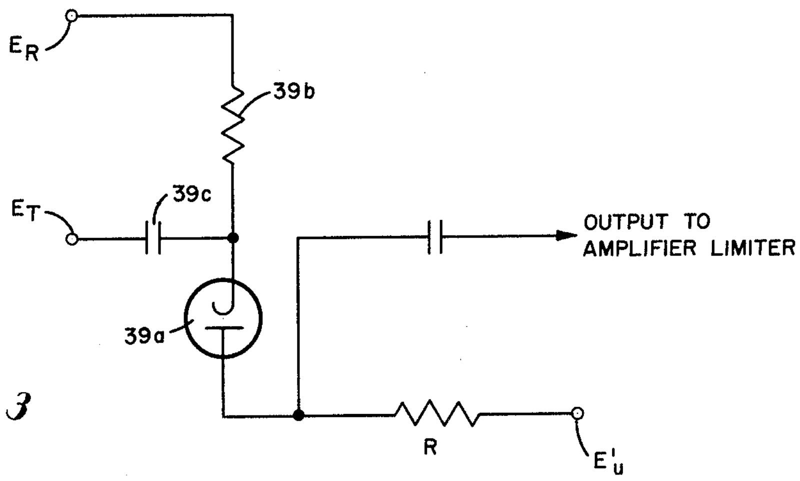
FIG. 3 is a circuit diagram of one comparator and gate circuit adapted to the system of FIG. 1.

The comparator gate 39 shown in enlarged detail in FIG. 3 is one example of a gate for passing clock pulses $E_T$ only when the negative digit-voltages, $E_R$, exceeds value of the scaled negative voltage, $E_U{}^1$, to be converted to digital form. The negative $E_T$ pulses, preferably with well controlled amplitudes, are applied through the blocking capacitor 39*c* to the cathode of the diode 39*a*. These pulses are superimposed on the direct current level of the cathode established by the $E_R$ signal applied through resistor 39*b*. The direct current level of the anode of the diode is established by voltage $E_U{}^1$. The diode 39*a*, when polarized as shown, will conduct current when the sum of $E_R$ plus $E_T$ pulses is more negative than voltage $E_U^1$. A bias voltage added to either $E_R$ or $E_U^1$ equal to the fixed amplitude of the $E_T$ pulses will then cause output pulses to appear only at such times as $E_R$ exceeds $E_U^1$ by a finite amount.

For read-out, multivibrator 50, FIG. 1, is triggered by the pulse applied to the flip-flop of the least significant digit. The multivibrator 50 is of the type which is monostable and will return to its initial state a measured time after this initial state has been disturbed by the clock pulse to the $2^0$ flip-flop. The read pulse is derived from the trailing edge of the delay multivibrator pulse of 50, preferably by a simple differentiating circuit. This places the read-out after the $E_T$ pulse which follows the last, or $2^0$, pulse of the cycle. Sufficient time is thereby allowed for resetting the $2^0$ flip-flop, should the $2^0$ flip-flop require resetting. The overall reset pulse for all flip-flops after read-out has occurred is formed from the trailing edge of the read pulse, insuring that the read-out operation is complete before the flip-flops are reset and before the contents therein might be lost.

In the event that the device into which the output binary number is read requires a relatively long period of time to respond, such, for example, as several clock pulse intervals from oscillator 1, the read multivibrator pulse width must be lengthened accordingly. Should this be the case, it would be necessary to blank the counter trigger pulses occurring during the read period so as to not disturb the flip-flop settings during reading.

EXAMPLE

An example showing how an unknown voltage is converted into a digital representation will be given to demonstrate the operation of the circuits described. The following assumptions are made:

(1) An unknown voltage of 1.446 volts is to be converted to digital form (or measured).

(2) The device is designed with selectable "scales" of 0–.1, 0–1, 0–10 and 0–100 volts.

(3) The device is designed so that amplifier 32 will never be required to furnish more than +200 volts output.

(4) The binary number need only be *proportional* to the unknown voltage.

Figure 5:
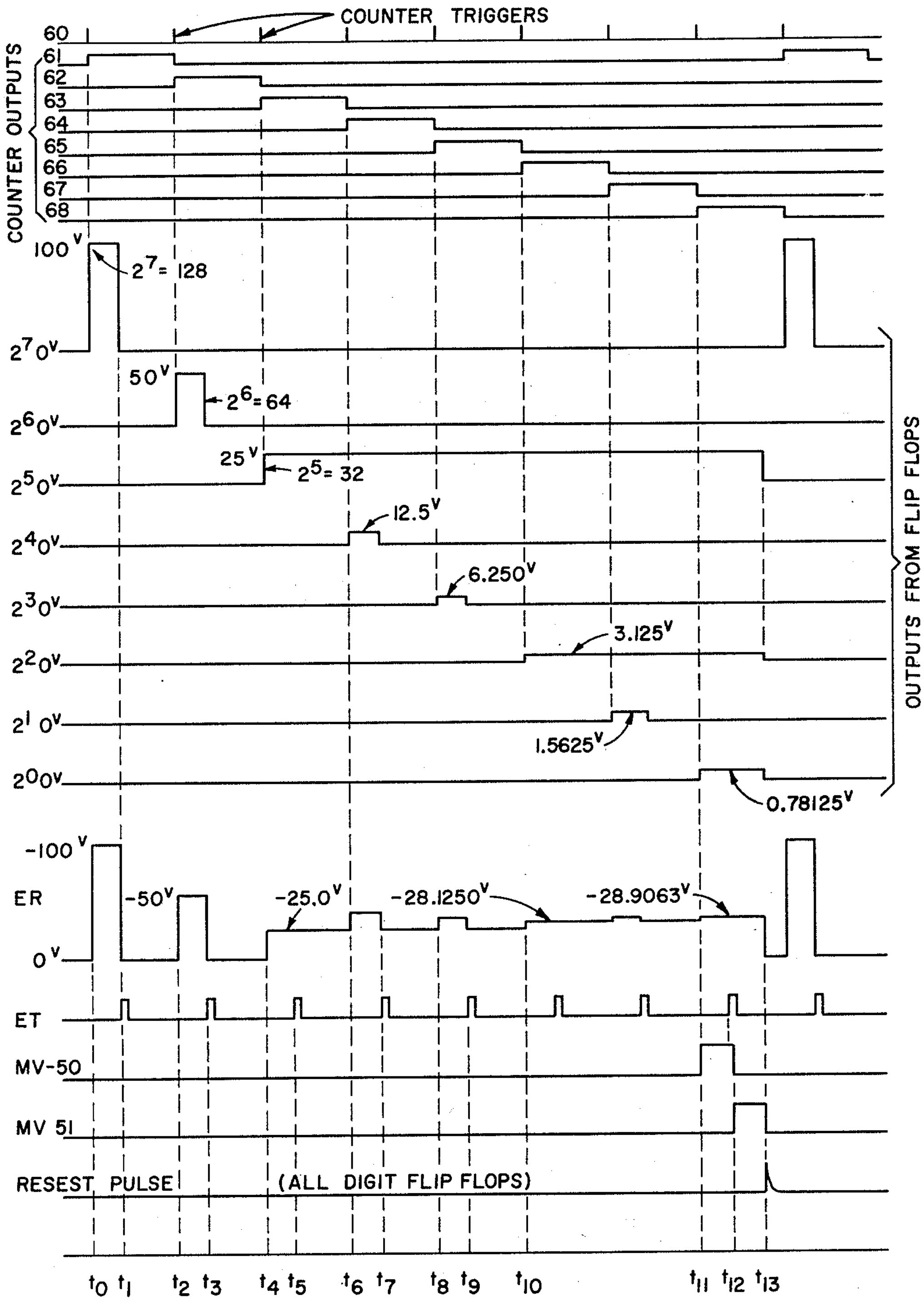
FIG. 5 is a time chart of voltage pulses in the system of FIG. 1.

Reference will be made to the functional block diagram of FIG. 1 and the timing diagram of FIG. 5.

The 0–10 volt scale is appropriate for measurement of a voltage of 1.446 volts. Hence, scale selecting switch 38 of amplifier 34 selects a feedback resistor of such value as to cause amplifier 34 to exhibit a gain sufficient and precisely equal to that value which when multiplied by 10 volts will produce −200 volts or a gain of −20.000. Thus, the maximum input voltage which the device can accommodate on the 10 volt scale will correspond with the maximum output voltage of amplifier 32 which also corresponds with the maximum binary number which can be represented by the 8 digit system or 256.

In this example, then, the +1.446 volt input will produce a voltage of $-20\times1.446$ volts or −28.920 volts $=E_U^1$.

One complete cycle of the voltage measuring circuits, which requires 8 pulses, should yield a binary number of value equal to $1.446/10.000\times256$, or 37.0176. The first pulse from the oscillator 1 drives the commutating device 2 from its last position 10 to position 3 which turns on the $2^7$ flip-flop via lead 11. By way of summing resistor 31, a positive voltage is impressed on lead 23 which after inversion and possible amplification in 32 results in a −100 volt level identified as $E_R$. Amplifier 32 may have a gain of unity or any other value appropriate for the design.

Since $E_R$ voltage of −100 volts exceeds −28.920 volts $=E_U^1$, the comparator gate 39 will pass any $E_T$ pulses presented to it. After a short delay in 40, the same oscillator pulse as previously mentioned appears as an $E_T$ pulse which passes through the comparator gate. After amplification and limiting in 41, it enters both "and" gates of the $2^0$ stage. This stage is "off" since the commutator has only arrived at position 3, so only the A gate will pass pulses. Likewise, all higher order stages are off except the first, so the $E_T$ pulse previously mentioned passes from one A gate to the next and so on down the line until stage $2^7$ is reached. Here the flip-flop is "on," so the pusle passes through the A′ gate which resets the flip-flop to "off." This event is shown as time $t_1$ on FIG. 5.

In a similar fashion, the second oscillator pulse "tries" −50 volts which again exceeds −28.920 volts, so the $2^6$ flip-flop is reset to zero or "off." At time $t_4$ the third pulse initiates an $E_R$ level of only −25 volts, and since this is less than $E_U^1$, the $2^5$ flip-flop is left in the "on" state. The timing diagram shows how succeeding pulses result in rejection of $2^4$, $2^3$, acceptance of $2^2$, rejection of $2^1$, and acceptance of $2^0$. This results in a binary number of 00100101 or 37. This does not agree with the theoretical value of 37.0120 since our $2^8$ system used as an example is not capable of resolution beyond 1 part in 256.

Coincident with the turning on or triggering of the $2^0$ flip-flop, a delay multivibrator 50 is triggered. The trailing edge of its output signal triggers a "read" multivibrator 51 whose output signal opens all "and" read gates whose other inputs are leads 52–49. These are connected to each of the digit flip-flops $2^0$–$2^7$. Thus, the states of the digit flip-flops are sampled and transmitted as a parallel binary output on 8 separate leads during the read period. The trailing edge of the read pulse resets all digit flip-flops to zero, via lead 60, after which the circuit is ready to perform a second reading and conversion of the unknown voltage. It will be noted that the sum of all voltages contributing to the $E_R$ voltage from flip-flops left "on" is numerically equal to the unknown voltage after scale change within the tolerance of the system. Thus:

$$E_U^1=-28.920 \text{ volts}$$

$$E_R=\begin{array}{r}-25.00000\\-3.12500\\-0.78125\\\hline 28.90625\end{array}$$

and $$\begin{array}{r}28.92000\\-28.90625\\\hline .01375\end{array}\ \text{volt}$$

Thus, the residual signal error is less than the value corresponding with the smallest binary digit at $2^0$.

While a specific embodiment of this invention has been shown and described, other modifications will readily occur to those skilled in the art. It is not, therefore, desired that this invention be limited to the specific arrangement shown and described, and it is intended in the appended claims to cover all modifications within the spirit and scope of this invention.

What is claimed is:

1. An analogue-to-digital voltage converter comprising a clock pulse generator, a commutator, said commutator being connected to said clock pulse generator and being adapted to produce clock pulses successively on the output leads of the commutator in synchronism with the clock pulses, a series of flip-flops, said flip-flops being bistable and having trigger circuits and output circuits, the output leads of said commutator being coupled to said flip-flops for successively triggering and setting said flip-flops, a bus, a series of sources of weighted voltages, the voltages of said sources being exponentially-related, circuits for selectively and successively connecting each voltage source to said bus and adding the voltage of each source to said bus in response to the output circuits of triggered flip-flops, a comparator-gate, said comparator-gate comprising an input and an output terminal between which clock pulses must pass, and first and second control circuits connected, respectively, to said bus and to the voltage to be measured, said comparator-gate having means responsive to the relative values of the voltages at said first and second control circuits for selectively passing or blocking the flow of clock pulses between said input and output terminals depending on said relative values, and a logical and-gate network connected between the output terminal of said comparator-gate and said flip-flops and responsive to each clock pulse passed by said comparator-gate for resetting each set flip-flop.

2. An analogue-to-digital converter comprising a clock pulse generator, a commutator connected to said generator and with a plurality of leads successively actuated by the pulses of said clock generator, a series of flip-flops with trigger circuits connected, respectively, to the leads of said commutator for successively setting said flip-flops, a plurality of voltage sources associated respectively with said flip-flops, the value of the voltage sources being exponentially-related, means responsive to said flip-flops for adding the voltages of said sources; a comparator-gate, said comparator-gate being coupled to said voltage sources, to said clock generator and to the unknown voltage to be measured for passing clock pulses when said added voltages exceed said unknown voltage, means for resetting each flip-flop in response to the clock pulses passed by said comparator-gate, said means for resetting each flip-flop comprising a first series of cascaded and-gates associated respectively with each flip-flop, one input of each and-gate of said first series being connected to one output of the associated flip-flop, and the other input of said and-gate being connected to the output of the next adjacent and-gate, a second series of and-gates, the output of each and-gate of said second series being connected with the input circuit of the associated flip-flop, and with the two input circuits of the second-series and-gates connected, respectively, with the other output of said flip-flop and with the corresponding input of the other associated and-gate.

3. The converter defined in claim 2 further comprising means for delaying clock pulses between said generator and said comparator-gate.

4. In the system defined in claim 2, said comparator-gate comprising an input and an output circuit between which clock pulses must pass, and first and second control circuits connected, respectively, to said means for adding said sources and to said voltage to be measured, said comparator-gate having means responsive to the relative values of the voltages at said first and second control circuits for selectively passing or blocking the flow of clock pulses between said input and output circuits depending on said relative values.

5. In an analogue-to-digital converter, a series of flip-flops, a clock pulse source, means responsive to said source for successively triggering and setting the flip-flops, a bus, a digit-voltage source associated with each flip-flop, the voltage of each source having a distinctive weighted value and being adapted to be applied to said bus by each flip-flop as the associated flip-flop is set; a comparator-gate having a controlled circuit and a controlling circuit, the controlling circuit being responsive to the relative values of the sum of the digit-voltages on said bus and the value of the voltage to be converted, a delay circuit, said delay circuit and said controlled circuit being connected in series and to said clock pulse source, means responsive to clock pulses which are passed by the delay and controlled circuit for resetting each flip-flop after the flip-flop is set and before the next clock pulse and for leaving each flip-flop in set condition the trigger pulse of which is not passed by said comparator-gate, and means for identifying and reading out the flip-flops which remain set after the clock pulse source has triggered all of said flip-flops.

References Cited in the file of this patent

UNITED STATES PATENTS

| | | |
|---|---|---|
| 2,717,994 | Dickinson et al. | Sept. 13, 1955 |
| 2,754,503 | Forbes | July 10, 1956 |
| 2,865,564 | Kaiser et al. | Dec. 23, 1958 |